(12) United States Patent
Furujo et al.

(10) Patent No.: US 6,693,256 B2
(45) Date of Patent: Feb. 17, 2004

(54) LASER PIERCING METHOD

(75) Inventors: Akira Furujo, Tokyo (JP); Hisahito Inagawa, Tokyo (JP)

(73) Assignee: Koike Sanso Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/132,144

(22) Filed: Apr. 26, 2002

(65) Prior Publication Data

US 2002/0166848 A1 Nov. 14, 2002

(30) Foreign Application Priority Data

May 8, 2001 (JP) .................................. 2001-137144

(51) Int. Cl.$^7$ .............................................. B23K 26/14
(52) U.S. Cl. ................................................ 219/121.72
(58) Field of Search ....................... 219/121.72, 121.67, 219/121.71, 121.84, 121.83, 121.68, 121.69, 121.7

(56) References Cited

U.S. PATENT DOCUMENTS 6,316,743 B1 * 11/2001 Nagahori et al. ...... 219/121.67

6,417,487 B2 * 7/2002 Nagura et al. ......... 219/121.84

* cited by examiner

*Primary Examiner*—M. Alexandra Elve
*Assistant Examiner*—Jonathan Johnson
(74) *Attorney, Agent, or Firm*—Townsend & Banta

(57) ABSTRACT

It is an object of this invention to provide a laser piercing method capable of reducing the time required for piercing a workpiece and satisfactorily forming a pierced hole. This invention provides a laser piercing method, in which a piercing process is performed by setting the level of a nozzle 6 during piercing execution to a value higher than the level of the nozzle 6 during cutting execution, setting the pressure of the assist gas during piercing execution to a value higher than the pressure of the assist gas during cutting execution, and setting the level of a focal point O of the laser beam 1 during piercing execution lower than the level of a focal point O of the laser beam 1 during cutting execution and subsequent to the piercing process a cutting process for cutting a workpiece 5 is performed by setting the level of the nozzle 6, the pressure of the assist gas, and the level of the focal point O of the laser beam 1 to a value prescribed for cutting execution, respectively.

3 Claims, 4 Drawing Sheets

(a)

(b)

(b)

(a)

LASER PIERCING METHOD

BACKGROUND OF THE INVENTION

1. Field of the Invention

This invention relates to a laser piercing method capable of satisfactorily forming a hole serving as a starting point in shape-cutting a workpiece.

2. Description of Related Art

In laser cutting, a workpiece is cut by repetitive physical reaction in which a focal point of a laser beam having a high energy density is set in a prescribed position in a thickness-wise direction of a workpiece and then irradiated upon the workpiece, and the position of the focal point is then moved along a targeted cutting line, thereby, a base material at the focal point and proximal to the focal point is instantaneously melted and removed by evaporation. Accordingly, a desired cut can be performed without restricting the material of the workpiece.

For example, when using a steel plate as a workpiece, the focal point of the laser beam is set to a position slightly inward from the surface of the steel plate in a thicknesswise direction, and the laser beam having the focal point as a starting point is then irradiated to the steel plate, so that a surface side of the steel plate and a minute portion in a thicknesswise direction are instantaneously melted and vaporized substantially at the same time.

The steel plate, accordingly, has a recess or a groove formed thereto by the vaporization of the base material. The workpiece can therefore be cut by moving the position of the focal point along a targeted cutting line, in which the base material is continuingly vaporized in association with the irradiation of the laser beam.

However, the vapor of the base material accumulated in the portion irradiated by the laser beam may prevent energy from being efficiently applied upon the workpiece. It is therefore general to inject an assist gas along with the laser beam, so that the injection energy thereof can remove the vapor of the base material.

Particularly when the workpiece is a ferrous metal in which burning reaction of the base material is expected, injection of oxygen gas which is injected along with the laser beam burns a portion of the base material and simultaneously removes the burnt material with the injection energy thereof to enable removing and cutting a wide area base material with the focal point of the workpiece serving as a starting point.

Shape-cutting, which is aimed to cut a workpiece into various shapes, is generally performed by first forming a pierced hole on a portion of the workpiece other than a portion thereof targeted as a product (piercing) and then cutting the workpiece with the hole serving as a starting point.

In such case, a laser torch is arranged in a position facing a portion of the workpiece targeted for forming the hole, a laser beam is then irradiated from the foregoing position to melt a portion of the base material of the workpiece, and an assist gas further removes the melted base material; thereby, a recess formed on a surface of the workpiece is grown in a depthwise direction for forming the penetrated hole.

In piercing the workpiece for forming a penetrated hole in a thicknesswise direction, the melted base material is removed from the surface of the workpiece by the injected energy of the oxygen gas until a hole is penetrated.

In this situation, the melted base material scatters and adheres to the distal end of the laser torch or enters into the laser torch creating a possibility of damaging the laser torch. It is therefore general to prevent the melted material from adhering to the laser torch by elevating the laser torch without changing the position of the laser condensing lens.

Nevertheless, although the foregoing conventional method of piercing can reduce the melted material from adhering to the laser torch, the melted material cannot be removed efficiently from the recess formed in the workpiece since the position of the focal point is fixed. Therefore, such inefficient removal of the melted material raises problems as requiring more time for piercing and causing increase in cost.

It is an object of this invention to solve the foregoing problems by providing a laser piercing method capable of reducing the time required for piercing a workpiece and satisfactorily forming a pierced hole.

SUMMARY OF THE INVENTION

The laser piercing method of this invention for solving the foregoing problems provides a piercing method for piercing a workpiece by irradiating a laser beam to a workpiece and injecting an assist gas to the workpiece, in which a piercing process is performed by setting the level of a nozzle during piercing execution to a value higher than the level of the nozzle during cutting execution and setting the pressure of the assist gas during piercing execution to a value higher than the pressure of the assist gas during cutting execution, and a cutting process, subsequent to the piercing process, is performed by setting the level of the nozzle and the pressure of the assist gas to a value prescribed for cutting execution, respectively.

With the foregoing laser piercing method, raising the level of the nozzle prevents melted material, such as spatter, from adherently scattering during piercing execution. Further, increasing the pressure of the assist gas prevents reduction of, for example, flow amount, flow rate, or purity of the assist gas, even when the level of the nozzle is raised.

Another laser piercing method of this invention provides a piercing method for piercing a workpiece by irradiating a laser beam to a workpiece and injecting an assist gas to the workpiece, in which a piercing process is performed by setting the level of a focal point of the laser beam during piercing execution lower than the level of a focal point of the laser beam during cutting execution, and a cutting process, subsequent to the piercing process, is performed by setting the level of the focal point of the laser beam to a value prescribed for cutting execution.

With the foregoing laser piercing method, lowering the level of the focal point of the laser beam during piercing execution enables a concentrated portion of laser energy to work deeply upon a workpiece in a thickness direction so as to melt and vaporize a portion of a base material of the workpiece and allow assist gas to remove the melted material and vaporized material of the base material from the surface of the workpiece; thereby, piercing can be performed satisfactorily and the time required for piercing can be shortened to restrain cost increase.

Further, when a pulsed laser output of the laser beam during piercing execution is step by step increased in a plurality of steps, in which each step is comprised of a set of plural pulses having a uniform output, the piercing process is initially performed with a uniform and low laser output and is step by step performed with a uniform and higher laser output being increased in association with the growth of a hole; thereby, piercing can be performed more satisfactorily compared to the conventional process of continuously increasing the pulsed laser output.

Further, the time required for piercing can be shortened to restrain cost increase when the pulsed laser output frequency of a laser beam during piercing execution is set no less than 20 Hz and no more than 200 Hz.

Another preferable laser piercing method provides a piercing method for piercing a workpiece by irradiating a laser beam to a workpiece and injecting an assist gas to the workpiece, in which the piercing process is performed by setting the pressure of the assist gas during piercing execution to a value higher than the pressure of the assist gas during cutting execution and increasing or reducing the pressure of the assist gas in relation to the lapse of time, and the cutting process, subsequent to the piercing process, is performed by setting the pressure of the assist gas to a value prescribed for cutting execution.

With this preferable laser piercing method of increasing or reducing the pressure of the assist gas, the assist gas being increased or reduced in relation to the lapse of time can effectively remove melted material and vaporized material of a portion of a base material of a workpiece, which has been melted or vaporized by laser energy, from the surface of the base material of the workpiece. Accordingly, piercing can be performed in a satisfactory state and the time required for piercing can be shortened to restrain cost increase.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF THE PREFERRED EMBODIMENTS

Figure 1:
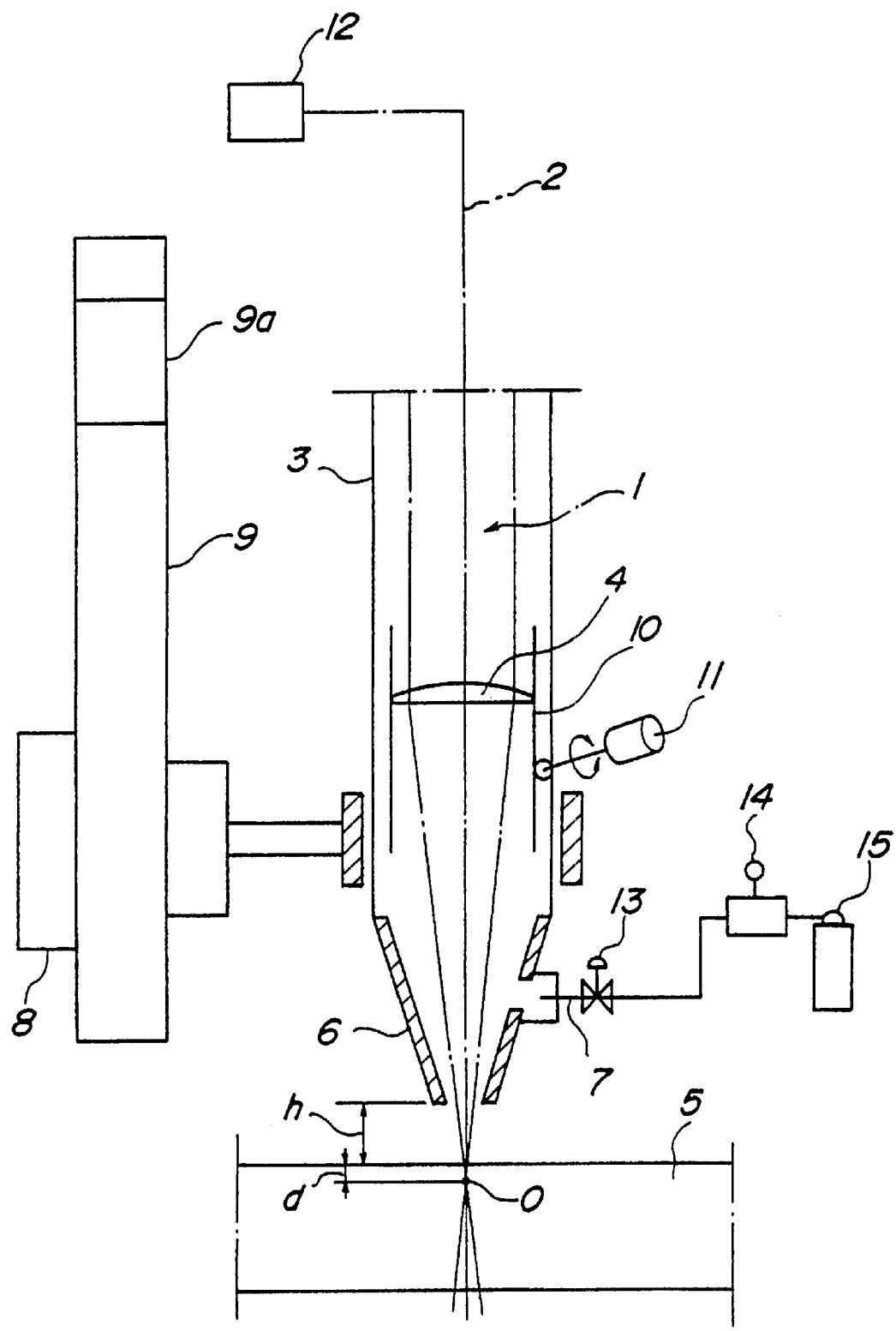
FIG. 1 is a schematic view showing a structure of a laser torch.
Figure 2:
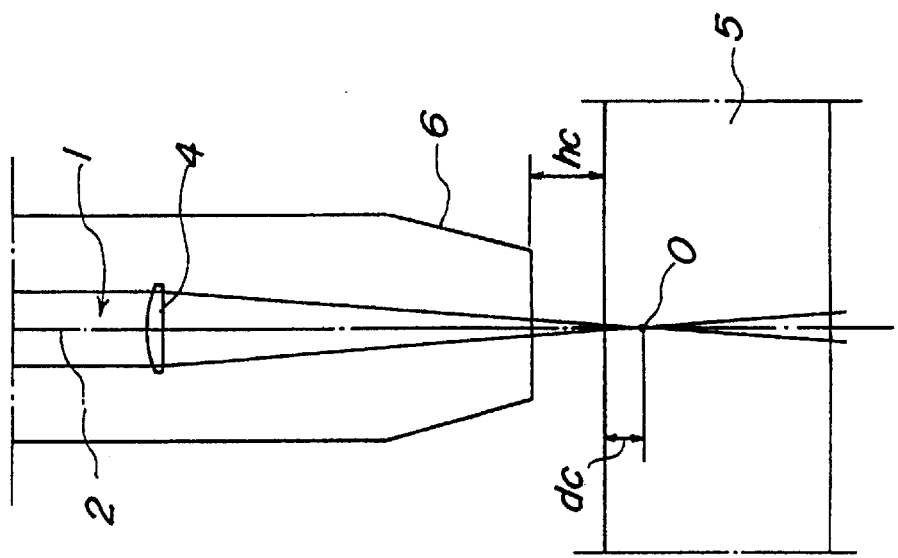
FIG. 2 is an explanatory diagram of a laser piercing method of this invention.
Figure 2:
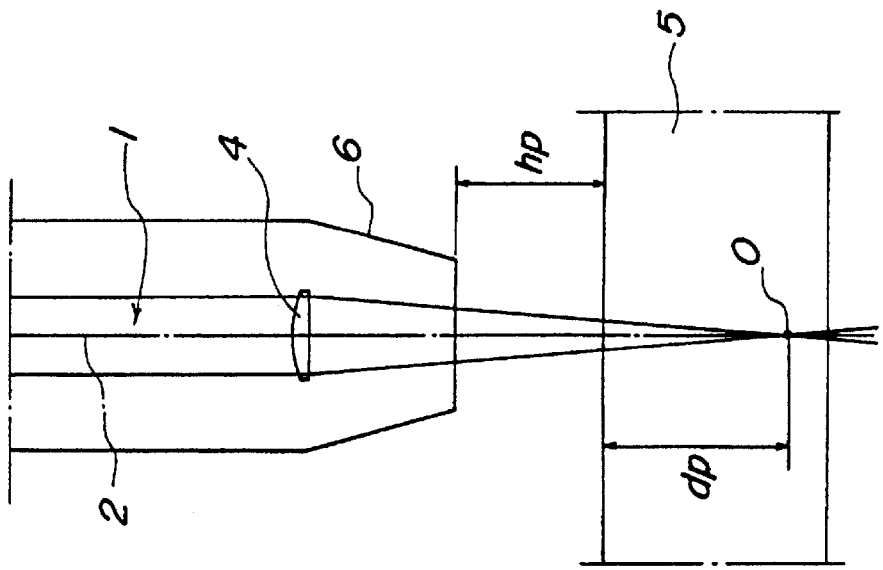
Figure 3:
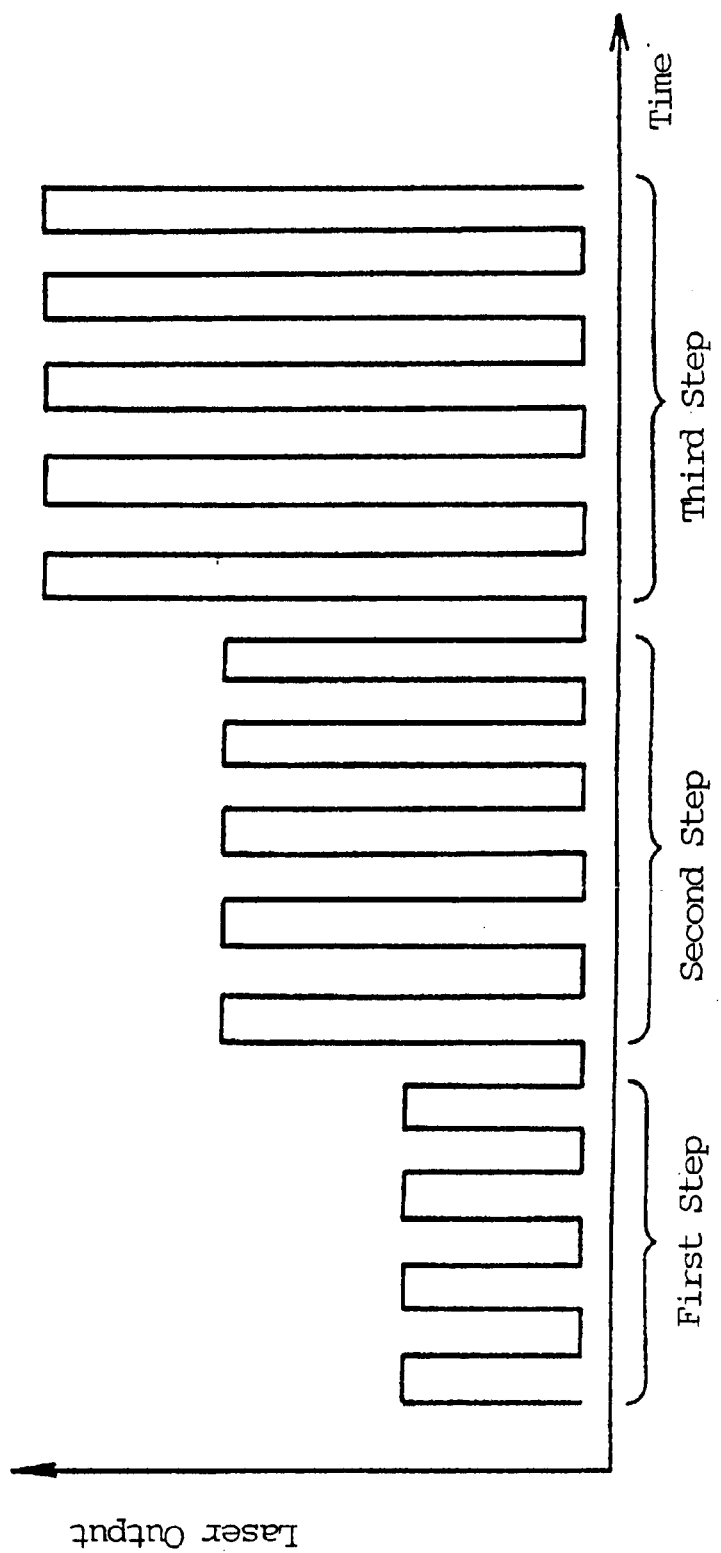
FIG. 3 is a diagram showing one example of a pulsed laser output being increased step by step in a plurality of steps, in which each step is comprised of a set of plural pulses having a uniform output.
Figure 4:
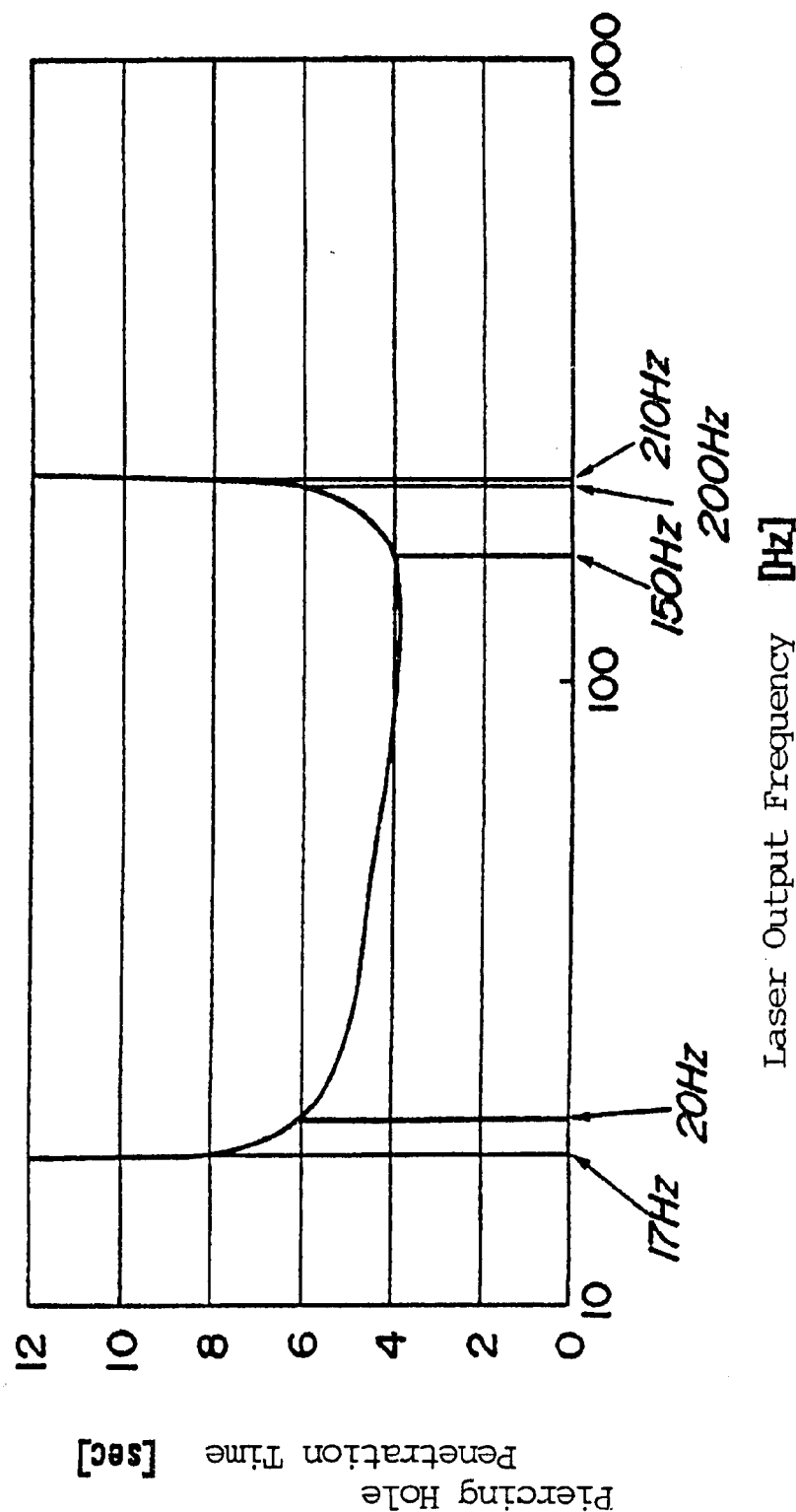
FIG. 4 is a diagram showing a relation between laser output frequency and piercing hole penetration time.

An embodiment of a laser piercing method of this invention will hereinafter be described in detail with reference to the drawings. FIG. 1 is a schematic view showing a structure of a laser torch; FIG. 2 is an explanatory diagram of a laser piercing method of this invention; FIG. 3 is a diagram showing one example of a pulsed laser output being increased step by step in a plurality of steps, in which each step is comprised of a set of plural pulses having a uniform output; and FIG. 4 is a diagram showing a relation between laser output frequency and piercing hole penetration time.

An example of a laser piercing method of this invention for controlling a pulsed laser output of a laser beam will first be explained with reference to FIG. 1, wherein the level of a nozzle and a position of a focal point of a laser beam are elevationally adjusted, and either an assist gas pressure is regulated, or an assist gas pressure is increased or reduced in relation to the lapse of time.

In FIG. 1, a laser beam 1 irradiated from a laser oscillator 12 reaches a laser torch 3 by being guided along a predetermined laser beam path (optical axis) 2, is then condensed to focal point O by a lens 4 arranged in the laser torch 3, is then irradiated to a workpiece 5, and thereby melts or vaporizes a portion of a base material of the workpiece 5.

The material of the workpiece 5 is not to be restricted in particular. However, this embodiment has a steel plate used as the workpiece 5 and employs a gas cutting procedure for performing continuous and satisfactory cutting, in which oxygen gas, serving as an assist gas regulated to a predetermined pressure and being injected from a nozzle 6 attached to a distal end of the laser torch 3, burns a base material melted by the irradiated laser beam 1 and removes melted base material, melted oxide or the like with an injection energy thereof.

The nozzle 6 attached to the distal end of the laser torch 3 is therefore detachably attached to a hose 7 connected to an oxygen gas supplying apparatus with an electromagnetic valve 13, a pressure regulator 14, an oxygen gas tank 15 and the like, and supplies oxygen gas regulated to a predetermined pressure via the hose 7.

The apparatus for moving the laser torch 3 is not to be restricted in particular. That is, there is no restriction regarding the apparatus as long as the apparatus is a cutting apparatus used for conventional gas cutting or plasma cutting and capable of following laser cutting speed.

The laser oscillator 12 in this embodiment is mounted on a dolly placed on a rail (not shown), and the laser torch 3 is mounted to a lateral carriage 8 laterally moving in a perpendicular direction with respect to the rail via a torch elevational adjusting torch apparatus 9 driven by an elevational adjustment torch motor 9a for elevationally adjusting the laser torch 3.

The lens 4 is attached to an elevationally adjustable tube body 10 arranged inside the laser torch 3, in which the elevationally adjustable tube body 10 is moved vertically by an elevational adjustment lens motor 11 for moving the lens 4 vertically.

A laser piercing method of this invention is next described with reference to FIG. 2 to FIG. 4. FIG. 2(a) is a schematic view showing a piercing stage, and FIG. 2(B) is a schematic view showing a cutting stage.

In the laser piercing method of this invention, level $h_p$, which is the level of the nozzle 6 in relation to the surface of the workpiece 5 during piercing execution shown in FIG. 2(a), is set to a value higher than level $h_c$ (cutting execution level), which is the level of the nozzle 6 in relation to the surface of the workpiece 5 during cutting execution shown in FIG. 2(b).

For example, in this embodiment, the level $h_p$ of the nozzle 6 during piercing execution is 5 mm, while the level $h_c$ of the nozzle 6 during cutting execution is 2.5 mm. It is now to be noted that the practical range of the level $h_p$ of the nozzle 6 during piercing execution is preferably no less than 3 mm and no more than 8 mm, when the level $h_c$ of the nozzle 6 during cutting execution is 2.5 mm.

The pressure of the oxygen gas serving as the assist gas during piercing execution is set to a value higher than the pressure of the oxygen gas during cutting execution (cutting execution pressure). The pressure of the oxygen gas supplied from the oxygen gas tank 15 is regulated by the pressure regulator 14.

For example, in this embodiment, the pressure of the oxygen gas during piercing execution is no less than 0.035 MPa and no more than 0.08 MPa, and the pressure of the oxygen gas during cutting execution is set no less than 0.03 MPa and no more than 0.035 MPa. It is now to be noted that the practical range of the pressure of the assist gas during piercing execution is set preferably no less than 0.02 MPa and no more than 0.1 MPa.

The level of the focal point O of the laser beam 1 during piercing execution is set to a value lower than the level of the focal point O of the laser beam 1 during cutting execution (cutting execution focal point level). That is, depth $d_p$, which is the depth of the focal point O of the laser beam 1 during piercing execution in relation to the surface of the workpiece 5, is set deeper than depth $d_c$, which is the focal point O of the laser beam 1 during cutting execution in relation to the surface of the workpiece 5.

For example, in this embodiment, the depth $d_p$ during piercing execution is set 3 mm to 7 mm deeper than the depth $d_c$, during cutting execution. Although the value of depth can be circumstantially changed in correspondence with the plate thickness of the workpiece 5, it is to be noted that the practical range regarding the depth $d_p$ of the focal point O of the laser beam 1 in relation to the surface of the workpiece 5 during piercing execution is no less than 1 mm and no more than 7 mm.

Subsequent to the piercing stage under the conditions shown in FIG. 2(a), the workpiece 5 is cut in accordance with the conditions prescribed for the transition to the cutting stage, in which the level of the nozzle 6, the pressure of the assist gas, and the level of the focal point O of the laser beam 1 are set to a value prescribed for cutting execution shown in FIG. 2(b), respectively.

The pulsed laser output of the laser beam 1 during piercing execution is controlled by the laser oscillator 12 and is step by step increased in plural steps as shown in FIG. 3, in which each step comprises plural pulses having uniform output. As shown in FIG. 3, the lateral axis indicates time and the longitudinal axis indicates laser output, in which the laser output is increased step by step in an order of a first step, a second step, and a third step.

It is to be noted that the steps increased in 3 steps shown in FIG. 3 are to be considered as illustrative and not restrictive, in which the laser output can also be step by step increased at least in two steps and can also be step by step increased in other plural, numerous steps.

The laser oscillator 12 controls the frequency of the pulsed laser output of the laser beam 1 during piercing execution and sets the frequency no less than 20 Hz and no more than 200 Hz.

FIG. 4 is a graph showing the relation between laser output frequency and piercing hole penetration time, in which the lateral axis indicates the laser output frequency [Hz] and longitudinal axis indicates piercing hole penetration time [sec] FIG. 4 shows one example in which a steel plate serving as the workpiece 5 has a plate thickness of 12 mm, the laser output is approximately 700 W (peak output 4 kw), the level of the focal point O of the laser beam 1 is arranged 2 mm lower than that during cutting execution, the level of the nozzle 6 is arranged 5 mm above from the surface of the workpiece 5, and the oxygen gas serving as the assist gas has a pressure of 0.07 MPa.

As shown in FIG. 4, penetration of a piercing hole can be accomplished between a range of 4 seconds to 6 seconds when the laser output frequency ranges from 20 Hz to 200 Hz. Piercing hole penetration time becomes excessively longer when the laser output frequency ranges below 20 Hz or above 200 Hz. Accordingly, a preferable range for the laser output frequency is no less than 20 Hz and no more than 200 Hz.

As shown in FIG. 4, a piercing hole can be penetrated in the shortest time when the laser output frequency is 150 Hz. Therefore, a more preferable laser output frequency would be approximately 150 Hz.

As another piercing method, a piercing process is performed by setting the pressure of oxygen gas serving as the assist gas during piercing execution to a value higher than the pressure of the assist gas during cutting execution by using the pressure regulator 14 and also increasing or reducing the pressure of the oxygen gas in relation to the lapse of time, and the cutting process subsequent to the piercing process is performed by setting the pressure of the oxygen gas to a value prescribed for cutting execution.

A change of force in the airflow of the oxygen gas can be created by increasing or reducing the oxygen gas pressure during piercing execution in relation to the lapse of time, thereby allowing effective removal of melted material accumulated inside the piercing targeted recess.

As a means for increasing or reducing the pressure of oxygen gas serving as the assist gas in relation to the lapse of time, the electromagnetic valve shown in FIG. 1 can be switched on and off at a prescribed cycle, or the pressure regulator 14 can have prescribed plural ports of different pressure arranged therein to enable the ports to be switched at a prescribed cycle.

It is now to be noted that an example of a preferable cycle for increasing or reducing the pressure of oxygen gas serving as the assist gas in relation to the lapse of time is a frequency of 0.2 Hz to 1 Hz. The pressure of oxygen gas serving as the assist gas can be increased or reduced in relation to the lapse of time, for example, in an on/off pulsed manner, or in a step by step manner of different pressure.

In the primary stage of the foregoing structure where piercing is performed, the laser beam 1 is irradiated to the focal point O on the workpiece 5 to melt and vaporize the base material of the target irradiated portion, and simultaneously, oxygen gas is injected to burn the melted base material and the injection energy thereof removes the melted material from the recess, and thereby, piercing can be performed satisfactorily.

In the piercing stage, the energy of the laser beam 1 is applied to a portion for forming the focal point O on the workpiece 5 and an area proximal to the focal point O to melt and vaporize the base material. More particularly, the oxygen gas injected along with the laser beam 1 burns the base material of the workpiece 5, creates melted base material and melted oxide, and forms a recess.

In forming or growing a recess upon the workpiece 5, the melted base material scatters relatively in a flat-level manner along the surface of the workpiece 5 when the recess is in a shallow state, and scatters in a sharp angle upward along the inner wall of the recess when the recess is in a deeper state.

The energy of the laser beam 1 melts the base material intensively, and a portion of the melted material scatters outward from the recess. However, all of the melted base material and the melted oxide are not instantaneously removed, but instead, most of the melted material remain accumulated within the recess.

Accordingly, the pressure of the oxygen gas serving as the assist gas is increased or reduced in relation to the lapse of time, so that the force of the airflow against the melted material accumulated within the recess can be altered and result to effective removal of melted material inside the recess.

Continuingly, a driven elevational adjustment torch motor 9a lowers the laser torch 3, and the oxygen gas serving as the assist gas is increased or lowered in relation to the lapse of time for further growing the recess. Subsequently, a penetrated hole is formed in a thickness direction as a result of the depthwise growth of the recess in the workpiece 5. Therefore, by forming a penetrated hole in a thicknesswise direction of the workpiece 5, the melted base material and the melted oxide are discharged downward from the hole and will not scatter upward.

This invention having the foregoing structure and function provides a laser piercing method, which can reduce the time required for piercing a workpiece and form a piercing hole satisfactorily.

That is, with the laser piercing method in claim 1, raising the level of the nozzle prevents melted material, such as spatter, from adherently scattering during piercing execution. Further, increasing the pressure of the assist gas prevents reduction of, for example, the flow amount, flow rate, or purity of the assist gas even when the level of the nozzle is raised.

With the laser piercing method in claim 2, lowering the level of the focal point of the laser beam during piercing execution enables a concentrated portion of laser energy to work deeply upon a workpiece in a thickness direction so as to melt and vaporize a portion of a base material of the workpiece and allow assist gas to remove the melted material and vaporized material of the base material from the surface of the workpiece; thereby, piercing can be performed satisfactorily and the time required for piercing can be shortened to restrain cost increase.

When a pulsed laser output of the laser beam during piercing execution is step by step increased in a plurality of steps, in which each step is comprised of a set of plural pulses having a uniform output, the piercing process is initially performed with a uniform and low laser output and is step by step performed with a uniform and higher laser output which is increased in association with the growth of a hole; thereby, piercing can be performed more satisfactorily when compared to the conventional process of continuously increasing the pulsed laser output.

The time required for piercing can be shortened to restrain cost increase when the pulsed laser output frequency of a laser beam during piercing execution is set no less than 20 Hz and no more than 200 Hz.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A laser piercing method for piercing a workpiece by irradiating laser beam to the workpiece and injecting an assist gas to the workpiece; the laser piercing method comprising:

a piercing stage being performed by setting the level of a nozzle during piercing execution to a value higher than the level of the nozzle during cutting execution and setting the pressure of the assist gas during piercing execution to a value higher than the pressure of the assist gas during cutting execution; and a cutting stage being performed subsequent to the piercing stage and being performed by changing the level of the nozzle and the pressure of the assist gas to the level of the nozzle and the pressure of the assist gas during cutting execution.

2. The laser piercing method of claim 1, wherein a pulsed laser output of the laser beam during piercing execution is step by step increased in a plurality of steps, in which each step is comprised of a set of plural pulses having a uniform output.

3. The laser piercing method of claim 1, wherein the frequency of the pulsed laser output of the laser beam during piercing execution is set no less than 20 Hz and no more than 200 Hz.

* * * * *